Sept. 28, 1954   L. A. MARIHART   2,690,043
ASPARAGUS HARVESTING MACHINE
Filed April 3, 1950   4 Sheets-Sheet 1
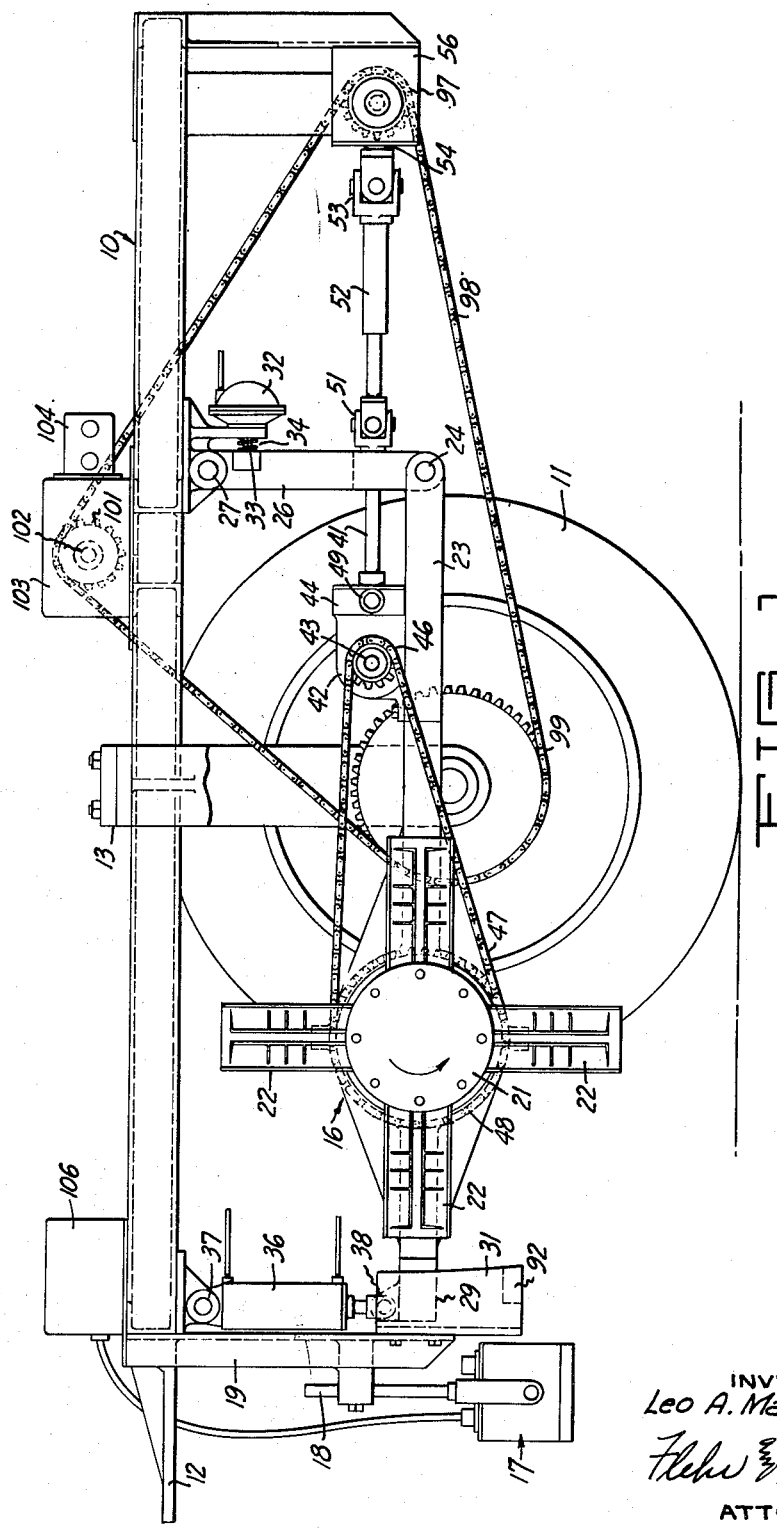
INVENTOR
Leo A. Marihart
ATTORNEYS Sept. 28, 1954
L. A. MARIHART
2,690,043
ASPARAGUS HARVESTING MACHINE
Filed April 3, 1950
4 Sheets-Sheet 2
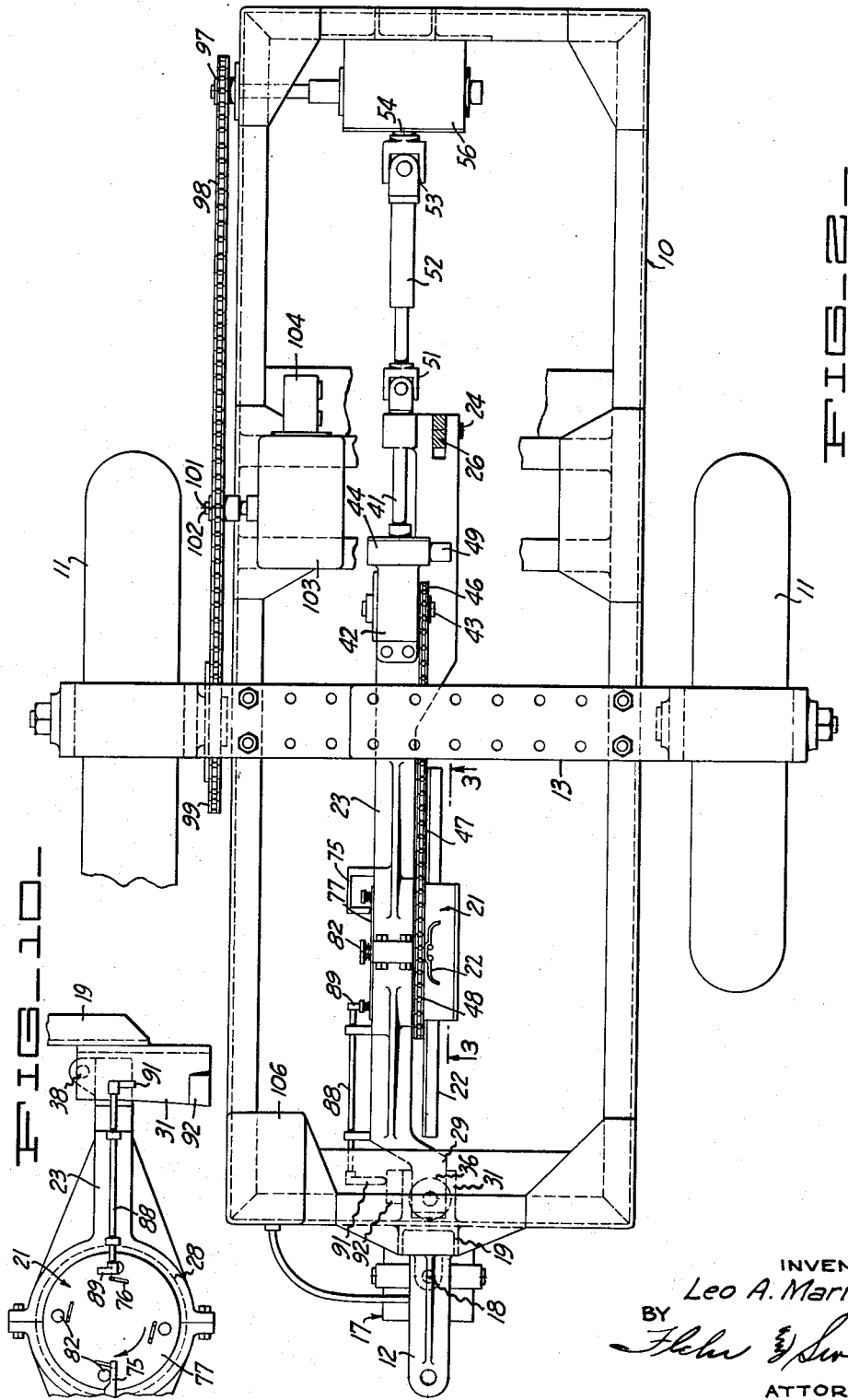
INVENTOR
Leo A. Marihart
BY
ATTORNEYS

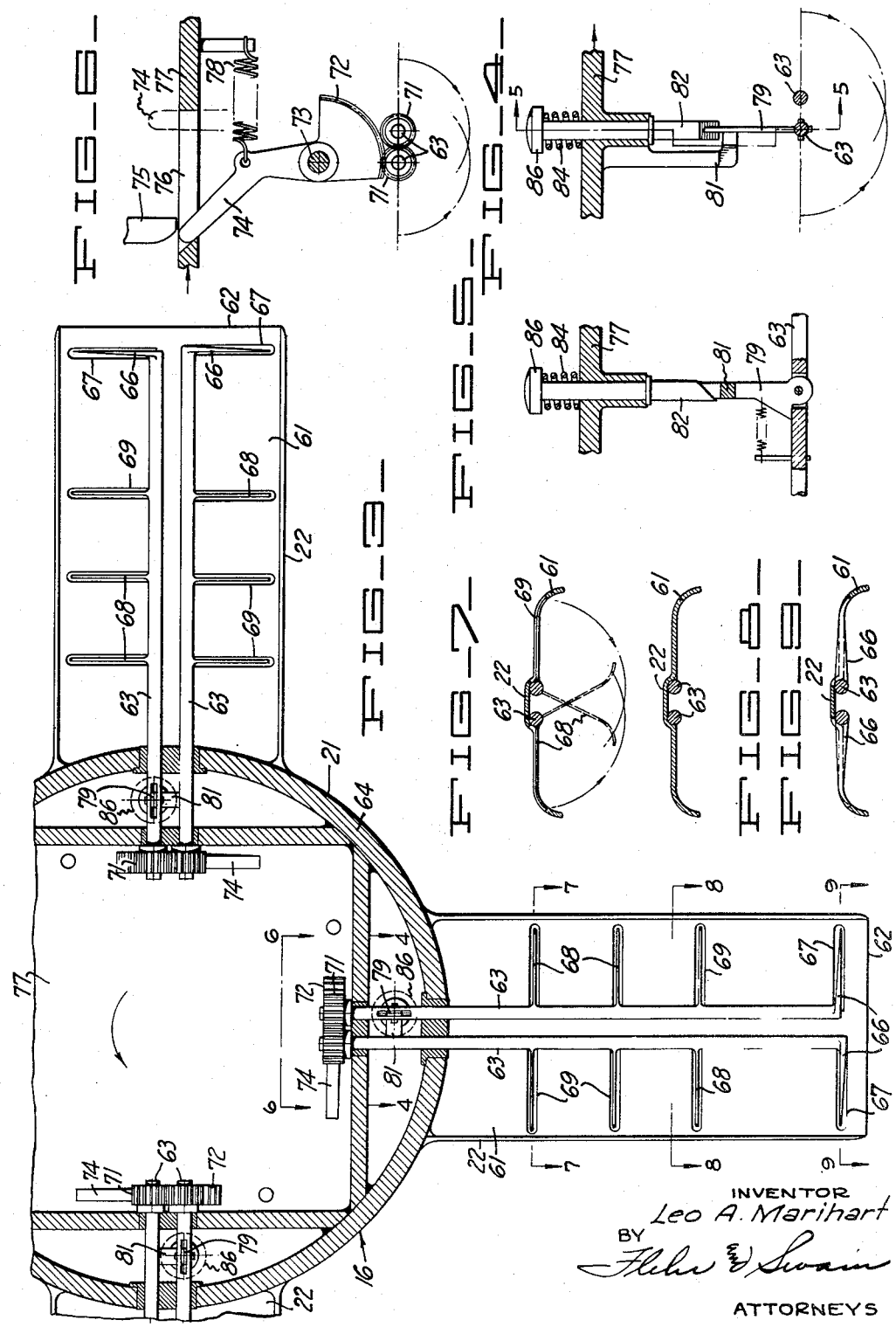

Sept. 28, 1954   L. A. MARIHART   2,690,043
ASPARAGUS HARVESTING MACHINE
Filed April 3, 1950   4 Sheets-Sheet 4
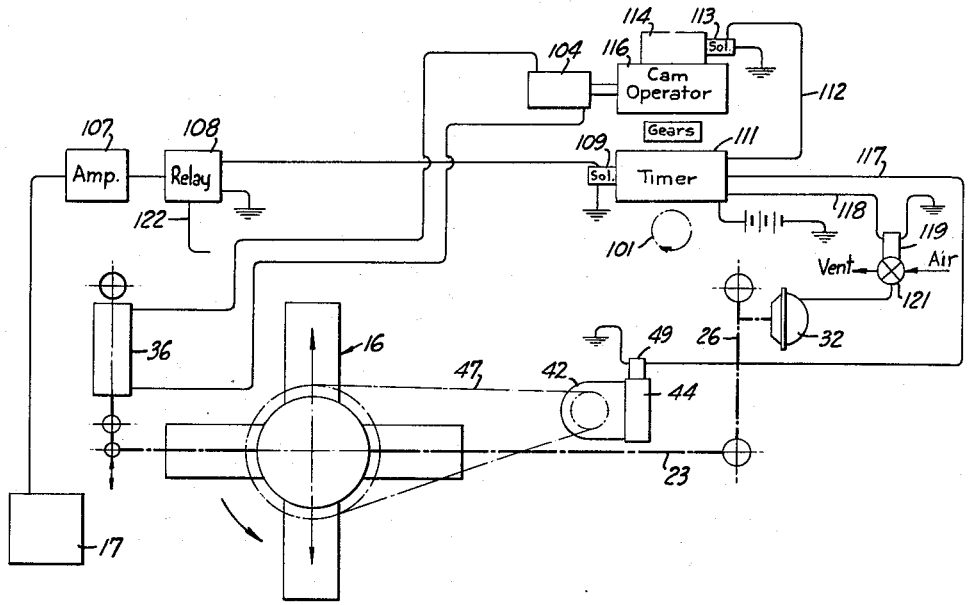
FIG_11_
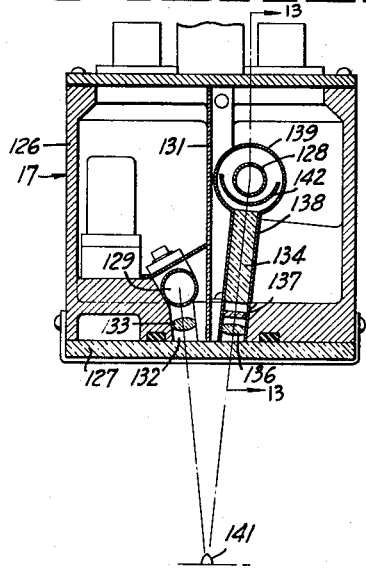
FIG_12_
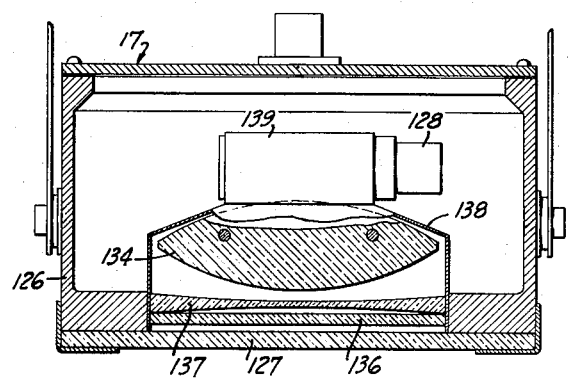
FIG_13_
INVENTOR
Leo A. Marihart
BY
ATTORNEYS Patented Sept. 28, 1954

2,690,043

UNITED STATES PATENT OFFICE 2,690,043

ASPARAGUS HARVESTING MACHINE

Leo A. Marihart, Monterey County, Calif.

Application April 3, 1950, Serial No. 153,645

7 Claims. (Cl. 56—327)

This invention relates generally to machines for the automatic harvesting of certain vegetables, and is particularly applicable to the harvesting of asparagus or like vegetable sprouts.

At present it is customary practice to harvest asparagus sprouts by hand labor, with the result that the costs involved are relatively high.

Asparagus is commonly grown in relatively straight beds, and in soil which is quite friable. In the first part of the growing season succulent sprouts advance upwardly through the soil to finally appear as white tips penetrating through the ground surface. These tips are readily visible and in the customary harvesting operations involving hand labor, the sprout is cut off by a knife thrust into the bed after which the severed sprout is lifted from the bed. The condition of the sprout at the time of harvest will depend somewhat upon the type of sprout or tip desired. If so-called white tips are desired the sprouts are harvested when the sprouts first appear through the surface of the ground. The green tip type of asparagus is harvested at a later time. The harvest season generally extends over a period of several weeks, during which time the bed must be harvested repeatedly to remove the sprouts as they appear.

It will be evident from the foregoing that a harvesting machine for carrying out asparagus harvesting operations presents a difficult problem, particularly in that if the machine is to be successful the sprout removing operations of the machine must be selective in its operation.

It is an object of the present invention to provide a machine suitable for asparagus harvesting operations, and which will be selective in its operation.

A further object of the invention is to provide a machine of the above character which can be used repeatedly during a harvesting season.

Another object of the invention is to provide an improved machine of the above character which is not unduly complicated in mechanical construction, and which is applicable to present day asparagus raising methods.

Additional objects of the invention will appear from the following description in which the preferred embodiments of the invention have been set forth in detail in conjunction with the accompanying drawing.

Referring to the drawing:

Figure 1 is a side elevational view illustrating a machine incorporating the present invention.

Figure 2 is a plan view with parts broken away of the machine illustrated in Figure 1.

Figure 3 is an enlarged fragmentary detail in section illustrating particularly the construction of the probes and the means for mounting and operating the same, and taken along the line 3—3 of Figure 2.

Figure 4 is an enlarged detail in section illustrating the means employed for releasing the cutting knives carried by the probes and taken along the line 4—4 of Figure 3.

Figure 5 is a cross-sectional detail taken along the line 5—5 of Figure 4.

Figure 6 is an enlarged detail in section taken along the line 6—6 of Figure 3.

Figure 7 is an enlarged cross-sectional detail taken along the line 7—7 of Figure 3.

Figure 8 is an enlarged cross-sectional detail taken along the line 8—8 of Figure 3.

Figure 9 is an enlarged cross-sectional detail taken along the line 9—9 of Figure 3.

Figure 10 is a detail illustrating a journal for mounting the probe unit and also illustrating a part of the means for releasing the cutting knives of the probes.

Figure 11 is a diagrammatic view illustrating all of the parts of the machine and serving to explain the manner in which the machine operates.

Figure 12 is a side elevational view with parts broken away and shown in section illustrating a suitable construction for the photoelectric unit.

Figure 13 is a cross-sectional view taken along the line 13—13 of Figure 12.

The present machine involves the use of a plurality of probe devices adapted to be thrust into the ground adjacent the asparagus sprout, and which serve to cut off the sprout at a proper distance below the ground surface, and to retract the severed sprout when the probe is retracted. The means for supporting and operating these probes is controlled by the use of one or more photoelectric devices, which are carried by the machine in advance of the probes. By such photoelectric means the probes are accurately controlled so that they are advanced into the bed alongside mature sprouts and are immediately thereafter retracted with the severed sprout, without disturbing the remainder of the bed. The probes can be carried and operated by various types of mechanisms, but in the present instance they are carried as a part of one or more wheel-like devices, which can be moved in a vertical direction, and which are indexed by predetermined angular amounts to bring successive probes into operative position.

The embodiment of the invention illustrated in the drawing consists of a suitable frame 10 which is carried by the wheels 11. In this instance a draft member 12 has been shown carried by the forward end of the frame, whereby the machine can be towed by a suitable tractor of the farm type. To facilitate adaptability, the wheels 11 are shown attached to the members 13 which are adjustably attached to the frame to enable an extension of the distance between the wheels.

Carried by the frame 10, in a manner to be presently described, there is at least one ground-engaging unit 16, and a photoelectric device 17 for control of the same. The photoelectric device is shown carried by the rod 18, which in turn is adjustably secured to the depending extension 19 of the frame 10.

The ground-engaging unit 16 is preferably in the form of a wheel, as shown in Figures 2 and 3. The wheel includes a hub 21 which mounts a plurality of radially extending probes 22. In this instance four probes are employed, spaced 90° apart.

In order to enable vertical movement of the unit 16, while at the same time maintaining the position of the wheel in a direction laterally of the machine, special support means are employed including in this instance the arm 23, which has its rear end pivoted at 24 to the lower end of a supporting link 26. The upper end of this link is pivotally attached at 27 to the frame of the machine. A suitable bearing 28 (Figure 10) serves to journal the hub of the wheel 16 to the arm, whereby the wheel 16 may rotate about a horizontal axis, and may also be moved in a vertical direction together with vertical movement of the arm 23. In order to confine the arm 23 against side movement, suitable guide means is employed. Thus a member 29 (Figures 1 and 2) is attached to the arm 23 at its forward end, and is slidably guided within a trackway or channel 31, which in turn is carried by the frame of the machine. The guideway 31 accommodates vertical movement of the arm, while at the same time accommodating relative movement between the frame and the wheel 16 in a direction longitudinally of the plant bed.

Normally the member 29 is advanced completely within the guideway 31, as illustrated in Figure 1. However when the wheel and arm 23 are moved downwardly to thrust one of the probes 22 into the ground, the frame of the machine is momentarily permitted to advance while the wheel 16 and the arm 23 remain relatively stationary with respect to the ground. Such relative movement between the wheel and arm 23 with respect to the machine frame is accommodated by swinging movement of the link 26. Immediately after the wheel 16 has been moved upwardly to retract the probe from the ground, the wheel moves forwardly with respect to the machine frame to return the member 23 completely within the guideway 31. The means used in this instance to insure such return movement is in the form of a pneumatic operator 32, carried by the frame of the machine, and having its movable operating member 33 adapted to engage and urge the link 26 forwardly. When air under pressure is applied to the pneumatic operator 32, the diaphragm of the same forces member 33 against the link 26, to thereby advance the arm 23 and the wheel 16 forwardly as previously described. In addition to or in the place of the use of operator 32 it is desirable to continuously urge the wheel 16 and arm 23 forwardly of the machine, as by means of the tension spring 34. If desired hydraulic means can be substituted for the pneumatic means 32.

Suitable means can be employed for lowering and raising the arm 23 together with the wheel 16. In the embodiment illustrated a hydraulic ram 36 is employed for this purpose. The cylinder for this ram has a pivotal connection 37 to the frame of the machine, and the piston rod has a pivotal attachment 38 to the forward end of the arm 23. By employing a ram of the double acting type, with a suitably controlled hydraulic actuator, the arm 23 can be lowered and raised at a desired rate and in proper timed relation with other operations of the machine.

Drive means is provided to the wheel 16 to turn the same through a predetermined angle immediately following upward movement from ground-engaging position. In Figure 2 this means consists of a shaft 41 which is rotatably mounted upon the arm 23, and which operatively connects through bevel gearing 42, with the countershaft 43. The shaft 41 is provided with a cyclic clutch 44, whereby when the clutch is engaged rotation of shaft 43 serves to drive a sprocket 46. This sprocket is connected by chain 47 with a sprocket 48 mounted upon the wheel hub 21. With a proper drive ratio, the clutch 44 can be of the one revolution type, such as disclosed in my Patent 2,475,432. The solenoid 49, which is adapted to be energized to release the clutch, is connected to a circuit for remote operation, as will be presently described. Shaft 41 is connected by universal coupling 51 with a splined extensible shaft 52, which in turn is connected by universal coupling 53 with a shaft 54 which extends from the gear box 56. Assuming a one to four reduction between the sprockets 46 and 48, one revolution of the countershaft 43 will turn the wheel 16 one quarter revolution, thus bringing the next probe 22 into vertical position for entry into the ground.

The probes 22 are constructed in such a manner that they enter the ground adjacent to a sprout to be removed, and they are provided with knives or cutting means for cutting off the sprout at the desired distance below the surface of the ground. In addition the probes are constructed in such a manner that after such cutting operation, the sprout is held whereby lifting of the probe serves to lift the severed sprout from the ground.

The probe construction illustrated in Figures 3 to 9 inclusive is as follows: A relatively rigid bayonet-like body 61 has its lower end 62 formed for ready entry into the ground. The cross-sectional contour of the blade can be as illustrated in Figures 7 to 9 inclusive. Thus in this instance the blade is cupped on one side, corresponding to the operating side of the probe. A pair of shafts 63 extend longitudinally of the probe and through the rim 64 of the wheel hub 21. Knives 66 are mounted upon the lower ends of the shafts 63, and are normally accommodated in the recesses or slots 67. Fingers 68 are also attached to the shafts 63, and are normally accommodated in the recesses or slots 69. Within the hub 21 of the wheel the shafts 63 are provided with pinions 71 which are meshed together, thus causing the shafts 63 to rotate in unison. It will be evident that by applying rotation to the shafts, the knives 66 together with the fingers 68 can be projected to positions substantially as illustrated in Figure 7, or retracted to out-of-the-way positions within the slots 67—69.

Suitable means for operating the shafts 63 is illustrated in Figures 3, 4 and 6. Within the hub 21 there is a gear sector 72, pivotally mounted at 73 and carrying the extended operating arm 74. This arm is adapted to extend through a slot 76 in the side wall 77 of the hub 21. A tension spring 78 urges the sector 72 in a clockwise direction as viewed in Figure 6. Thus the shafts 63 are normally urged by the spring 78 to position the knives in projected position. Latch means is provided for retaining the shafts and knives in retracted position, and consists for example of a latch arm 79 which is pivotally attached to one of the shafts 63, and which for its spring urged lowermost position illustrated in Figure 4, is adapted to engage the stationary abutment 81. The free end of the latch arm 79 is provided with an inclined cam face as illustrated in Figure 5, and this face is adapted to be engaged by the inclined inner end of the release pin 82. This pin is slidably mounted within the side wall 77 of the hub 21. Compression spring 84 normally urges the pin 82 into retracted position. When the end 86 of the pin 82 is forced inwardly, cam arm 79 is lifted to free it from the abutment 81, thus permitting both of the shafts 63 to rotate under the urge of tension spring 78. Such latch releasing operation necessarily results in rapid rotation of the shafts 63 under the urge of spring 78, to rapidly swing the knives 66 and retaining fingers 68 to projected positions.

Various means can be employed for performing a latch releasing operation immediately after or about the time a probe reaches its lowermost position in the ground. For example a shaft 88 can be journaled upon the arm 23, and provided with a finger 89. This finger is adapted to engage a release button 86, to force the same inwardly to release the latch arm 79. The other end of shaft 88 is provided with another arm 91, which is adapted to engage a cam 92 provided on the guide 31. Thus when the arm 23 is forced downwardly by the hydraulic jack 36, and the probe has been forced to the desired depth into the ground, cam 92 rotates shaft 88 to cause the finger 89 to release the latch arm 79, thus causing the cutting knives 66 and the retaining fingers 68 to be projected. Arm 91 is reset by its unbalanced weight when no longer supported by cam 92. It may be explained at this point that the knives 66 serve to cut off a sprout at the desired depth, while the fingers 68 hold the sprout to cause its retraction when the probe is lifted from the ground. Strike plate 75 is attached to arm 23 in a position as shown in Figure 2 to cause the arm 74 to be returned to latched position thereby resetting shafts 63 upon the completion of the rotation of wheel 16. Return of the arm 23 to latched position rotates latch 79 and its associated shaft 63 clockwise as viewed in Figure 4. At the completion of such rotation arm 79 latches over the abutment 81, whereby it is in the position shown in solid lines in Figure 4, ready for another release operation.

When the machine is of the trailer type as illustrated, power for operating various parts of the machine can be taken from the wheels 11. Thus as shown in Figure 2 the gear box 56 is mounted at the rear of the machine on the frame, and has an operating shaft which is connected by sprocket 97 to a drive chain 98, which leads to a sprocket 99 on the wheel 11. The same chain 98 can be engaged with a sprocket 101 mounted upon the shaft 102 extending from the box 103.

The box 103 can be used to house certain operating parts which must be driven at a speed corresponding to the forward movement of the machine, including particularly a timer, a one revolution clutch and a cam operator. The cam means serves to actuate the double acting hydraulic operator 104, which in turn supplies actuating liquid to the hydraulic jack 36.

Another housing 106 is shown carried by the frame of the machine and serves to enclose certain of the electrical parts, particularly the amplifying and relay means used in connection with the photoelectric device.

The manner in which the various operating parts of the machine are interconnected is better explained by reference to Figure 11. The photoelectric device 17 connects with the amplifier 107, which in turn connects to the relay 108. The photoelectric device includes a suitable source of light together with a light sensitive photo tube, and can be constructed in a manner to be presently described in detail. It is preferable to use a pulsating source of light, as for example light produced from a lamp of the fluorescent type, supplied with pulsating current. The amplifier employed should be selectively tuned to the frequency of the light source, and should be capable of supplying proper current responses to the relay for operation of the latter. A suitable electronic amplifier is disclosed in Packard et al, 2,536,591.

The relay 108 is connected to the release solenoid 109 of the timer 111. The timer can be of the type disclosed in my Patent 2,437,168 dated March 2, 1948. The switches provided in connection with this timer are shown connected to various solenoids for performing timed operations. Thus line 112 from one of the switches leads to to the solenoid 113, which controls the one revolution clutch 114. This clutch controls operation of the cam operator 116, which effects cyclic operation of the plunger of the hydraulic operator 104. Line 117 leads to the solenoid 49 which serves to operate the one revolution clutch 44. Line 118 leads to the solenoid 119, for operating the air supply and vent valve 121. This valve is connected to a source of air supply under pressure and to the pneumatic operator 32 as illustrated. When solenoid 119 is de-energized, the chamber of pneumatic operator 32 is vented to the atmosphere. However when solenoid 119 is energized valve 121 is positioned to connect device 32 to the supply of air under pressure, whereby link 26 is forced to the left as viewed in Figure 11.

Relay 108 can be of the interlocking type whereby it remains actuated until rearmed by application of a current pulse through line 122. A rearming pulse is applied to this line by an additional timer switch.

Figures 12 and 13 illustrate a suitable photoelectric device. Thus in this instance there is a metal housing 126 having a glass plate 127 mounted across its lower end. Within the housing and above the glass plate, there is a photoelectric tube 128 and a lamp 129. The lamp is preferably of the fluorescent type as previously described. Between the photoelectric tube and the lamp 129 there is a partition or baffle wall 131, which extends down to the surface of the glass plate 127. In the passage 132 formed between the glass plate and the lamp 129, there is a lens 133 for focusing purposes.

Between the photoelectric tube 128 and the glass plate there is a substantially flat lens 134 which can be formed of suitable transparent plastic material, and a second lens 136. The upper and lower edges of the lens 134 can be concave or contoured as illustrated in Figure 13 and the upper and lower faces of the lens 136 can be convex, and in the form of cylindrical lens surfaces. In addition to these lenses a lens 137 can be provided which has concavely contoured upper and lower lens faces as illustrated in Figure 13. All of the lenses 134, 136, 137 can be enclosed in a metal shroud 138, which carries an upper casing 139 for enclosing the photoelectric tube 128. The purpose of the lens system just described is to enable an optical focus on the region 141 below the photoelectric device. Preferably this region is a narrow band having its major dimension laterally of the plant bed, and its minor dimension in the direction of travel of the machine. In a typical instance the major dimension can be of the order of about 2.5 inches, and the minor dimension about one-half inch. It will be evident that when such a photoelectric device is traversed over an asparagus bed, at a height from the surface of the ground corresponding generally to the focal length or the distance between region 141 and the plate 127, the photoelectric tube will secure positive light responses from the relatively white tips of asparagus sprouts. A suitable light filter 142 can be inserted adjacent the photo tube 128 to secure color discrimination.

In addition to providing an appropriate lens system, suitable filters can be employed to make the response selective with respect to the color of the asparagus tips. Thus by the use of suitable color filter, the device can be made responsive to tips which are green rather than white, vice versa. The operation of my machine as a whole can now be reviewed as follows: The distance between the wheels 11 is adjusted so that these wheels operate between the plant beds. The machine is then drawn along the plant bed with the photoelectric device 17 positioned a proper distance above the ground surface corresponding as previously mentioned to about the focal length of the lens system employed. It is assumed that the various switches of the timers are adjusted so that when the light response is received from the photoelectric device, the various subsequent operations of the machine will be performed in proper timed sequence. Assuming that light response is received from the tip of an asparagus sprout, the solenoid 109 of the timer 111 is energized to release one of the elements of the timer, which thereafter moves into operative engagement with several switches controlling the lines 112, 117 and 118. Upon energizing the solenoid 113 of the clutch 114, the hydraulic operator 104 is operated whereby the hydraulic jack 36 forces the wheel 16 down into the ground and immediately thereafter retracts the same. As the lowermost probe 22 enters the ground, it is alongside the tip of the sprout from which the light response was received. As the probe enters the ground, the probe together with the entire unit 16 and the parts directly attached to the same remain stationary with respect to the ground, while the remainder of the machine moves forwardly. When the probe has completed its downward movement into the ground, the latch arm 79 is tripped by inward movement of the button 86, to thereby permit the shafts 63 to rotate in opposite directions to swing the knives 66 to their projected positions. During such movement of the knives the sprout is severed at a proper distance below the ground surface, and at the same time the fingers 68 swing about the severed sprout to cause the same to be retracted together with the probe, in the next operation. Immediately after release of the knives 66 and fingers 68, the probe moves upwardly whereby the severed sprout is lifted out of the ground together with any small amount of soil which may cling to the probe and fingers 68.

About the time the probe is retracted from the ground the clutch 44 is tripped by energizing solenoid 49, thus turning the wheel 16 to bring the next probe into position. As this rotation is completed arm 74, by engagement with strike plate 75 swings the gear sector 72 to rotate the shafts 63 against the tension of spring 78. At the same time latch arm 79 is drawn over the inclined face of abutment 81 to thereby reset the latch arm 79. About the same time that the solenoid 49 is energized, solenoid 119 is energized to cause air pressure to be supplied to device 32, thus urging the unit forwardly in position for the next cycle of operation.

It will be evident from the foregoing that my machine is capable of full automatic operation for the harvesting of asparagus or like sprout type vegetables, and it will perform these operations with a minimum of disturbance to the soil, and a minimum of mutilation or breakage of the root system. When the knives 66 and fingers 68 are retracted, the cut sprouts of asparagus can be permitted to fall down upon the surface of the bed, after which they can be picked up manually. If desired however, suitable conveying means can be incorporated in the machine, for catching the sprouts as they are released, and for conveying them to a point of storage.

I claim:

1. In a vegetable harvesting machine, means for insertion into the ground to sever a growing vegetable sprout at a level below the ground surface, and to retain or retract the severed sprout, means for supporting said first named means for movement along a plant bed, drive means for inserting and retracting said first named means with respect to the ground, and photoelectric means carried by said supporting means and serving to control operation of said last named means in accordance with the location of portions of the sprouts which are exposed above the ground.

2. In a vegetable harvesting machine, a probe device for insertion into the ground and including means for severing a growing vegetable sprout below the ground surface and also means for holding a severed sprout whereby the severed sprout is withdrawn from the ground when the probe device is withdrawn, drive means for inserting and withdrawing said probe device with respect to the ground, means for controlling said drive means responsive to the location of portions of the sprouts which are exposed above the ground surface, said last means including a photoelectric device disposed to receive light responses from said exposed portions of the sprouts, and means serving to support said probe means together with said drive means and said photoelectric device for movement along a plant bed.

3. In a vegetable harvesting machine, a support for movement along a row of plants, a plurality of probe devices for insertion into the ground, each device including means to sever a growing vegetable sprout at a level below the ground surface and means for holding a severed sprout whereby when the probe device is withdrawn from the ground the sprout is withdrawn therewith, means for movably carrying said probe devices on said support for successively positioning the devices into upright position for insertion and retraction from the ground and for movement of the devices in a general vertical direction for such insertion and retraction, drive means for actuating said probe devices to successively position the same in upright position and to insert and withdraw the same from the ground, and means for controlling operation of said drive means including a photoelectric device carried by said support in advance of said probe devices, said photoelectric device being responsive to light received from portions of the sprouts which are exposed above the ground surface, and time delay means responsive to said photoelectric device for controlling said drive means in accordance with light responses received by the photoelectric device.

4. In a vegetable harvesting machine, a support movable along a row of plants, a plurality of probe-like devices, each of said devices including means for severing a growing vegetable sprout at a level below the ground surface after the probe-like device has been inserted into the ground and also including means serving to hold a severed sprout to effect its withdrawal from the ground together with withdrawal of said device, mounting means carried by said support and serving to movably carry all of said probe devices for insertion into or retraction from the ground, a photoelectric unit carried by said support in advance of said probe devices, said photoelectric unit being disposed to receive light indications from portions of the vegetable exposed above the ground surface, drive means controlled by said photoelectric unit for thrusting a probe device into the ground and for retracting the same, and drive means also controlled by said photoelectric device for bringing said probe devices successively into an upright operating position for insertion into the ground.

5. In a vegetable harvesting machine, a support movable along a plant bed, a wheel-like unit carried by said support and rotatable about a horizontal axis at right angles to the path of movement of the support, said unit including a plurality of radially extending probes spaced circumferentially about the unit, each of said probes including means for severing a vegetable sprout at a level below the ground surface, and also means to hold the severed sprout to effect its withdrawal with withdrawal of the probe, drive means for moving the wheel-like unit in a general vertical direction to force a depending one of said probes into the ground and to retract the same, and additional drive means serving to turn the unit about said axis through predetermined angular increments to bring successive probes into depending position for entry into the ground.

6. In a vegetable harvesting machine, a support for movement along a plant bed, a wheel-like unit carried by said support, said unit including a plurality of circumferentially spaced probes, each probe including means for severing a vegetable sprout at a level below the ground surface and means to hold the severed sprout to effect its withdrawal together with withdrawal of the probe, drive means for moving said unit downwardly to cause the lower-most probe of the same to enter the ground and for subsequently moving the unit upwardly to retract the probe, additional drive means serving to rotate said unit through predetermined increments to bring said probes successively into position for entry into the ground, a photoelectric device carried by said support in advance of said unit and disposed to receive light responses from portions of sprouts exposed above the ground surface, and means controlled by the light responses of the photoelectric device for effecting automatic control of both said drive means in accordance with the location of sprouts.

7. In a vegetable harvesting machine, a support for movement along a plant bed, a wheel-like unit carried by said support for rotation about a horizontal axis, drive means for moving said unit in a vertical direction with respect to the ground, a plurality of probes spaced circumferentially about said axis and forming a part of said unit, the lower-most probe being thrust into the ground when said unit is moved downwardly, each of said probes including means for severing a vegetable sprout at a level below the ground surface and to hold the severed sprout to effect withdrawal of the same together with withdrawal of the probe, drive means for recurrently rotating said unit through predetermined increments in synchronism with vertical movements of the same to thereby successively position probes for entry into the ground, mounting means for said wheel-like unit serving to permit vertical movements of the same and also serving to permit the support to move forwardly relative to the wheel-like unit while a probe is in the ground, whereby the machine may move continuously while the probes are momentarily and successively stationary relative to the ground, and means including a photoelectric device carried by said support in advance of said unit for controlling operation of both said drive means in accordance with the location of sprouts, said last means being responsive to light indications received from portions of plants exposed above the ground surface.

References Cited in the file of this patent

UNITED STATES PATENTS

| Number | Name | Date |
|---|---|---|
| 986,773 | Smith | Mar. 14, 1911 |
| 1,137,777 | Moore | May 4, 1915 |
| 1,713,372 | Brown | May 14, 1929 |
| 1,878,349 | Terada | Sept. 20, 1932 |
| 2,088,676 | White | Aug. 3, 1937 |
| 2,302,208 | Glasener | Nov. 17, 1942 |